(12) United States Patent
Kursula et al.

(10) Patent No.: US 10,193,374 B2
(45) Date of Patent: Jan. 29, 2019

(54) MULTIFUNCTION BATTERY CHARGING AND HAPTIC DEVICE

(71) Applicant: Intel Corporation, Santa Clara, CA (US)

(72) Inventors: Mikko Kursula, Lempaala (FI); Kalle I. Makinen, Nokia (FI); Esa Saunamaki, Virrat (FI)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 15/086,131

(22) Filed: Mar. 31, 2016

(65) Prior Publication Data

US 2017/0288443 A1 Oct. 5, 2017

(51) Int. Cl.
*H02J 7/00* (2006.01)
*H02J 7/02* (2016.01)
*H04B 5/00* (2006.01)
*H04B 1/40* (2015.01)

(52) U.S. Cl.
CPC ............ *H02J 7/025* (2013.01); *H02J 7/0045* (2013.01); *H04B 1/40* (2013.01); *H04B 5/0037* (2013.01); *H02J 2007/0096* (2013.01)

(58) Field of Classification Search
CPC ...................................................... H02J 7/025
USPC ......................................................... 320/108
See application file for complete search history.

(56) References Cited

U.S. PATENT DOCUMENTS

| | | | | |
|---|---|---|---|---|
| 7,506,586 B1 * | 3/2009 | Pereira | .................. | F42C 11/008 102/207 |
| 9,118,187 B1 * | 8/2015 | Islam | ..................... | H02K 35/02 |
| 9,715,169 B2 * | 7/2017 | Fujimura | ............ | G06F 17/5072 |
| 2007/0107766 A1 * | 5/2007 | Langley, II | .............. | H02J 17/00 136/243 |
| 2007/0182362 A1 * | 8/2007 | Trainor | .................. | H01M 10/46 320/101 |
| 2008/0036617 A1 * | 2/2008 | Arms | ..................... | B64C 27/006 340/679 |
| 2009/0251099 A1 * | 10/2009 | Brantner | ............... | H02J 7/0032 320/101 |
| 2010/0060231 A1 * | 3/2010 | Trainor | .................. | H01G 11/14 320/103 |

(Continued)

FOREIGN PATENT DOCUMENTS

JP     2013070520 A     4/2013
JP     2013165043 A     8/2013

(Continued)

OTHER PUBLICATIONS

International Search Report and Written Opinion for International PCT Application Serial No. PCT/US2017/015406 filed Jan. 27, 2017 dated Apr. 20, 2017, 11 pages.

*Primary Examiner* — Suchin Parihar

(74) *Attorney, Agent, or Firm* — International IP Law Group, P.L.L.C.

(57) ABSTRACT

Techniques for implementing a multifunction device with battery charging and haptic feedback capabilities are described. An example of an electronic device includes a multifunction charger and a control circuitry configured to activate one of a plurality of available operating modes of the multifunction charger. The plurality of operating modes includes a wireless charging mode and a haptic feedback mode.

20 Claims, 7 Drawing Sheets

(56) References Cited

U.S. PATENT DOCUMENTS

| | | | | |
|---|---|---|---|---|
| 2010/0315035 A1* | 12/2010 | Belov | ............... | H01M 10/46 |
| | | | | 320/101 |
| 2011/0248846 A1* | 10/2011 | Belov | ............... | H04Q 9/00 |
| | | | | 340/539.1 |
| 2011/0309721 A1* | 12/2011 | Moler | ............... | B81B 3/0021 |
| | | | | 310/319 |
| 2012/0001518 A1* | 1/2012 | Moler | ............... | H02N 2/043 |
| | | | | 310/319 |
| 2012/0032876 A1 | 2/2012 | Tabe | | |
| 2012/0194037 A1* | 8/2012 | Moler | ............... | H01L 41/113 |
| | | | | 310/339 |
| 2015/0128733 A1* | 5/2015 | Taylor | ............... | H02J 7/025 |
| | | | | 73/865.8 |
| 2016/0211742 A1* | 7/2016 | Mohammad | ............ | H02J 50/00 |
| 2016/0241119 A1* | 8/2016 | Keeler | ............... | H02K 35/02 |
| 2017/0041205 A1* | 2/2017 | Rangel | ............... | H04L 43/065 |
| 2017/0237282 A1* | 8/2017 | Huang | ............... | H02J 7/345 |
| | | | | 307/48 |

FOREIGN PATENT DOCUMENTS

| | | |
|---|---|---|
| JP | 2014121135 A | 6/2014 |
| KR | 20160019249 A | 2/2016 |

* cited by examiner

100

122

700

MULTIFUNCTION BATTERY CHARGING AND HAPTIC DEVICE

TECHNICAL FIELD

This disclosure relates generally to a multifunction device with battery charging and haptic feedback capabilities. More specifically, the disclosure describes a multifunction device with vibrational energy harvesting, wireless charging, and haptic feedback capabilities.

BACKGROUND

As computer miniaturization progresses, an increasing number of features are expected to be incorporated into ever smaller packages. Consumers have come to expect small form factor devices such as smart phones, smart watches, bracelets, and other wearable devices to provide a host of electronic capabilities. Such devices are also expected to be energy efficient and easy to charge.

DETAILED DESCRIPTION

The subject matter disclosed herein relates to a multifunction device with vibrational energy harvesting, wireless charging, and haptic feedback capabilities. The multifunction device includes a magnetic system that can be configured to operate in three modes, including a wireless charging mode, an energy harvesting mode, and haptic feedback mode. Combining these features in a single component results in component volume savings compared to a system that is implemented using discrete single-function components.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
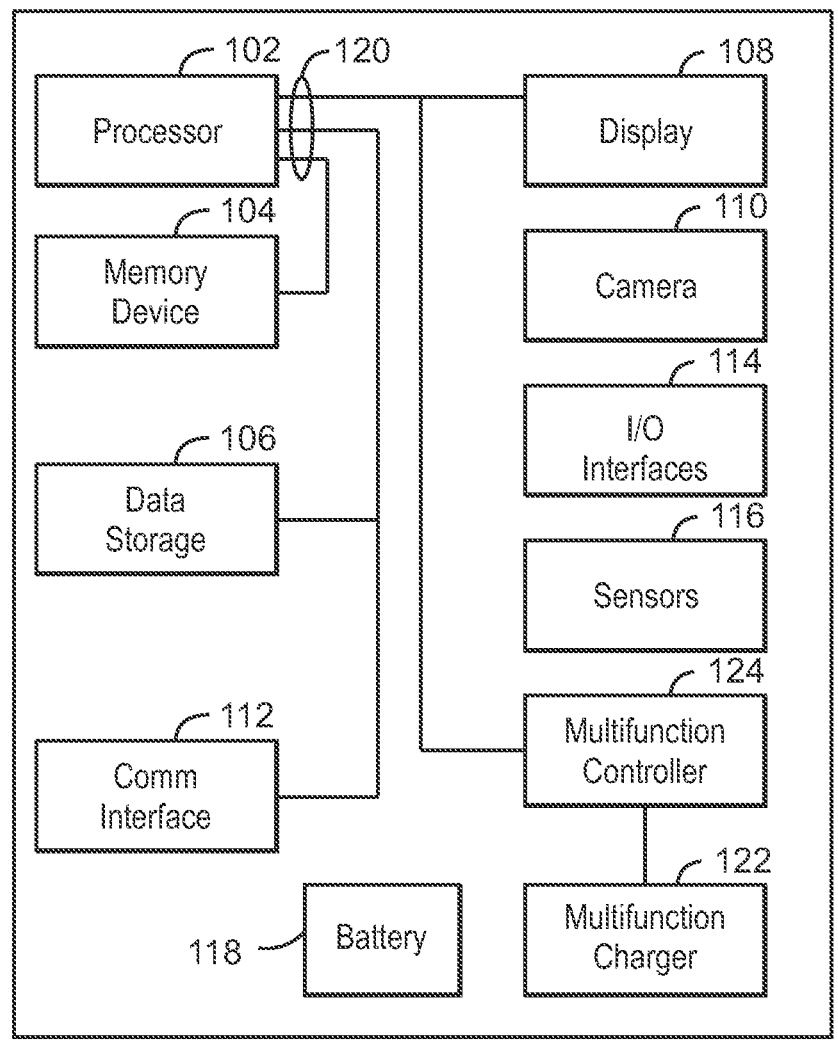
FIG. 1 is a block diagram of an example electronic device that includes the multifunction device described herein.

FIG. 1 is a block diagram of an example electronic device that includes the multifunction device described herein. The electronic device 100 may be a mobile device such as, a smart phone, a laptop computer, a tablet computer, or a wearable device such as a watch or bracelet, among others. The electronic device 100 may include a processor 102 that is adapted to execute stored instructions, as well as a memory device 104 that stores instructions that are executable by the processor 102. The processor 102 can be a single core processor, a multi-core processor System-On-a-Chip (SOC), a multi-chip module, and other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The electronic device 100 may also include a storage device 106. The storage device 106 is a non-volatile physical memory such as a flash drive. The electronic device 100 can also include a display screen 108 and a camera 110 configured to capture still images or video. Images or video captured by the camera 110 can be sent to various other components of the computing device 100, such as the display 108.

The computing device 100 may also include a communication interface 112 configured to connect the electronic device 100 to a network 116 or other devices. In some examples, the communication interface 112 includes a Wifi interface, a Bluetooth interface, a cellular phone interface, or some combination thereof. The electronic device 100 may also include one or more I/O devices 114, such as a touchscreen, a keyboard, buttons, and the like. The electronic device 100 may also include one or more sensors 116, such as accelerometers, magnetic sensors.

The electronic device 100 also includes a battery 118 that provides electrical power to the other components. Various additional components may be included depending on the design considerations for a particular implementation. Communications between various components of the electronic device 100 can be performed over one or more data busses 120. The bus architecture shown in FIG. 1 is just one example of a bus architecture that can be used with the techniques disclosed herein.

The electronic component also includes the multifunction device described further herein. The multifunction device is referred to herein as a multifunction charger 122. The multifunction charger 122 is configured to be operable in three modes, including a wireless charging mode, a vibrational energy harvesting mode, and a haptic feedback mode. When operated in the wireless charging mode or the vibrational energy harvesting mode, the multifunction charger is configured to provide an electrical charge to the battery 118. When operated in the haptic feedback mode, the multifunction charger 122 is configured to provide a haptic feedback in the form of a vibration. The haptic feedback may be used to alert the user of the electronic device regarding some event, such a receipt of a message, an incoming phone call, low battery condition, and others.

The multifunction charger 122 may be controlled by the processor 102 or a separate controller. In any case, the multifunction charger 122 can be configured to activate a mode specified by the controller, depending on a variety of factors. The activation of a particular mode may be based on user selection of a specific mode, environmental factors sensed by the sensors 116, and signals received by the electronic device 100 through the communication interface 112. The activation of the modes is described further below.

It is to be understood that the block diagram of FIG. 1 is not intended to indicate that the electronic device 100 is to include all of the components shown in FIG. 1. Rather, the electronic device 100 can include fewer or additional components not illustrated in FIG. 1. Furthermore, the components may be coupled to one another according to any suitable system architecture.

Figure 2:
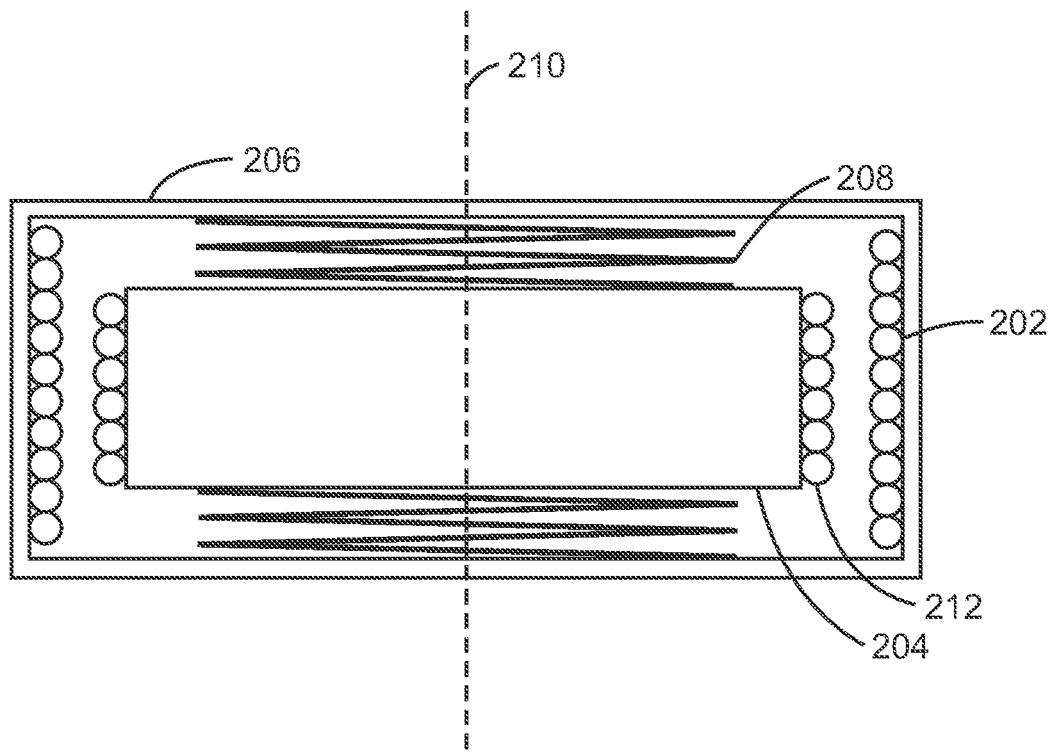
FIG. 2 is a cross-sectional view of the multifunction charger.

FIG. 2 is a cross-sectional view of the multifunction charger. The multifunction charger 122 includes a stationary coil 202 and a magnetic core 204 disposed within an enclosure 206. The stationary coil 202 is a conductive winding that may be disposed on an internal wall of the enclosure 206 and surrounds the magnetic core 204. The device enclosure 206 may be made of any magnetically permeable material, such as plastic. The device enclosure 206 may also be made of a combination of ferromagnetic and magnetically permeable materials.

The magnetic core 204 shown in FIG. 2 is suspended within the enclosure 206 by a pair of springs 208. The magnetic core 204 is mechanically balanced between the springs 208 so that the magnetic core 204 is free to move relative to the stationary coil 202. The magnetic core 204 is able to move in both directions along an axis 210. Although two springs are shown, the magnetic core 204 could also be suspended within the enclosure 206 by a single spring.

The magnetic core 204 may be made of magnetically soft ferromagnetic material, meaning that the material can be easily magnetized using external magnetic field, but does not retain the magnetization when the external field is removed. Examples of soft ferromagnetic material include iron and nickel. Another coil wiring, referred to herein as moving coil 212, is used to provide core magnetization current to the magnetic core 204. The moving coil 212 is connected to external circuitry using flexible wiring so that the moving coil 212 is free to move with the magnetic core 204. The multifunction charger 122 also includes electrical ports (not shown) coupled to both the stationary coil 202 and the moving coil 212.

In haptic feedback mode, an Alternating Current (AC) electrical signal is driven to the stationary coil 202 to provide magnetic force that moves the spring-loaded magnetic core 204. Direct current is driven to the moving coil 212 to magnetize the core 204. The springs 208 and the magnetic core 204 form a spring and mass system whose mechanical properties will be determined by a variety of factors, including the stiffness of the springs 208, the effective mass of the springs 208, the mass of the magnetic core 204, and the mass of the moving coil 212. The mechanical properties of the spring and mass system may be tuned so that the spring and mass oscillation frequency is suitable for haptic effects and vibrational energy harvesting. For example, the oscillation frequency may be tuned to approximately 170 Hz to 200 Hz.

In the wireless charging mode and the energy harvesting mode, the function of the stationary coil 202 is reversed, and the stationary coil is used to generate current. In wireless charging mode, the stationary coil 202 and the moving coil 212 can both be used as pick-up coils to receive magnetic energy from a wireless charging device. In the vibrational energy harvesting mode, the moving coil 212 is used to magnetize the magnetic core 204 and the stationary coil 202 is used to pick up the current produced by the moving magnetic core 204.

It will be appreciated that the multifunction charger 122 shown in FIG. 2 is one example of a multifunction charger 122 in accordance with the presently disclosed techniques. The multifunction charger 122 may include fewer or additional components not shown in FIG. 2, depending on the details of the specific implementation. For example, the magnetic core could also be a permanent magnet, in which case the moving coil 212 may be eliminated. Operation of the multifunction charger 122 is described further below in relation to FIGS. 3-6.

Figure 3:
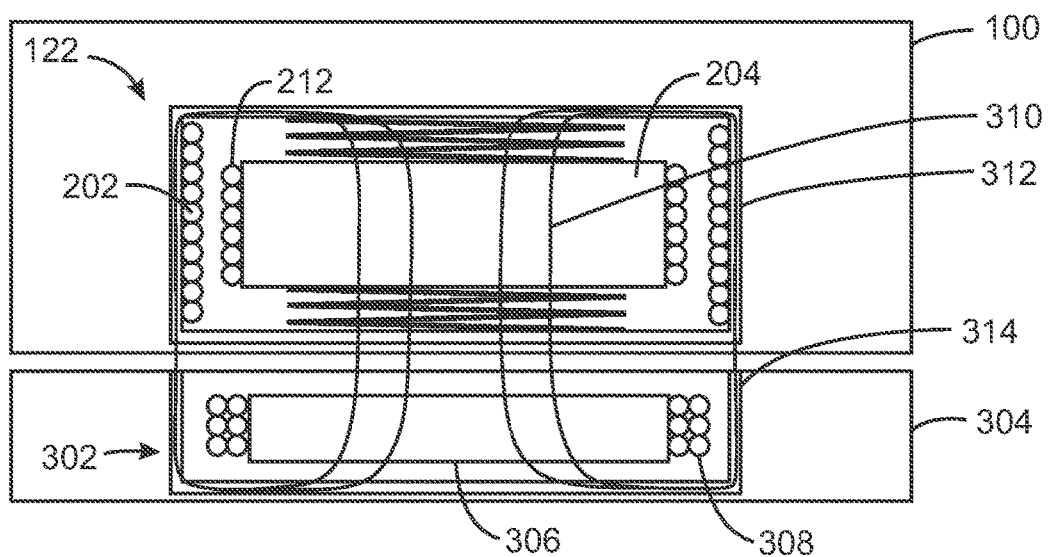
FIG. 3 shows the multifunction charger operating in the wireless charging mode.

FIG. 3 shows the multifunction charger operating in the wireless charging mode. When in wireless charging mode, the multifunction charger 122 functions as wireless charging power receiver. As show in FIG. 3, the multifunction charger 122 has been placed over a wireless power transmitter 302, which is a component of a charging pad 304. The wireless power transmitter 302 may include a transmission coil 308 surrounding a ferromagnetic core 306.

The transmission coil 308 generates an alternating electromagnetic field. In this mode, both the moving coil 212 and stationary coil 202 are configured to receive the magnetic energy emitted by the wireless power transmitter coil 308 as indicated by the field lines 310. The moving coil 212 and stationary coil 202 convert the electromagnetic field back into electrical current to charge the battery and/or power the device. The coils can be arranged electrically in series or in parallel depending on optimization targets related to power transfer efficiency. In some examples, the phase of the coils relative to each other can be changed by using capacitive loading or by reversing the wiring direction. The system may support more than one wireless charging systems.

Additionally, the magnetic core 204 is not magnetized during wireless charging mode. Thus, the magnetic core 204 works like a ferromagnetic core in a transformer and concentrates the magnetic fields inside the moving coil 212 and stationary coil 202, which will improve power transmission efficiency. In some examples, the multifunction charger 122 and/or the wireless power transmitter 302 may also be housed within ferromagnetic housings 312 and 314. As shown in FIG. 3, the ferromagnetic housings 312 and 314 surround the coils of the multifunction charger 122 and the wireless power transmitter 302 on all sides other than the side facing the opposing device. In this way, ferromagnetic housings 312 and 314 help to focus the magnetic fields inside the coils and minimize stray fields outside of the system.

Although not shown, the charging pad 304 can also include power delivery circuitry, control circuitry, communication circuitry that enables the charging pad to identify and communicate with compatible wireless power receivers such as the electronic device 100. The charging pad 304 and electronic device 100 may operate according to a magnetic resonance techniques or magnetic induction techniques. In some examples, the charging pad 304 and electronic device 100 operate according to a standard protocol such as a specification provided by Alliance For Wireless Power (A4WP), Wireless Power Consortium (WPC), Qi, and others. However, the techniques described herein may be implemented using any other wireless charging standard protocol where applicable.

Figure 4:
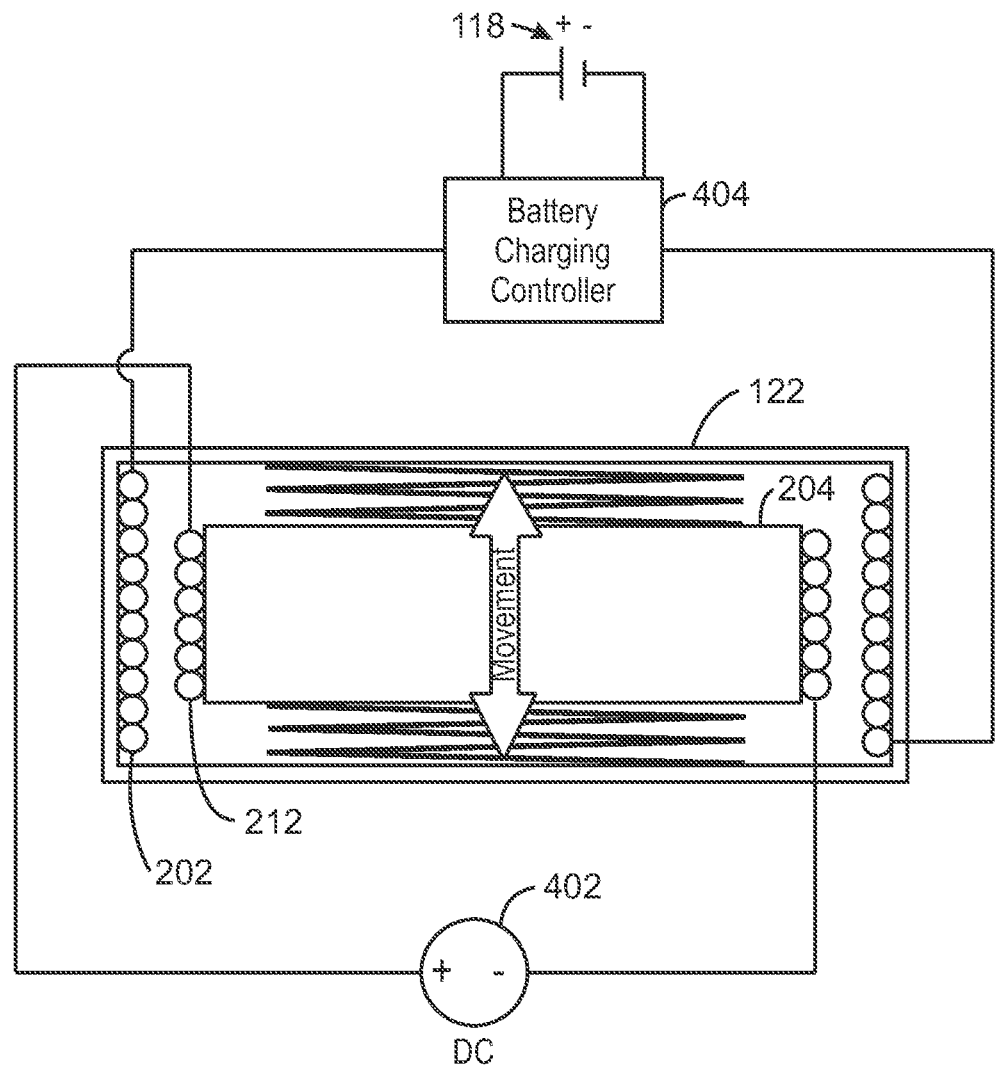
FIG. 4 shows the multifunction charger operating in the energy harvesting mode.

FIG. 4 shows the multifunction charger operating in the energy harvesting mode. When in energy harvesting mode, the multifunction charger 122 harvests vibrational energy to charge the battery 118. The multifunction charger 122 can be used to harvest vibrational energy in any number of scenarios. For example, if the multifunction charger 122 is used in a wrist worn wearable device, the multifunction charger 122 could harvest energy from hand motions.

In energy harvesting mode, the moving coil 212 is coupled to a DC voltage or current source 402, and the magnetic core 204 is magnetized by driving a DC current to the moving coil 212. Additionally, the stationary coil is coupled to the battery 118 through a battery charging controller 404. When mechanical vibrations cause motion of the magnetic core 204, the motion will induce electrical current in the wiring of the stationary coil 202, which can be then used to charge the battery 118 or otherwise power the electronic device 100. In some examples, the magnetization current for the moving coil 212 may be generated by the energy harvesting operation itself.

Figure 5:
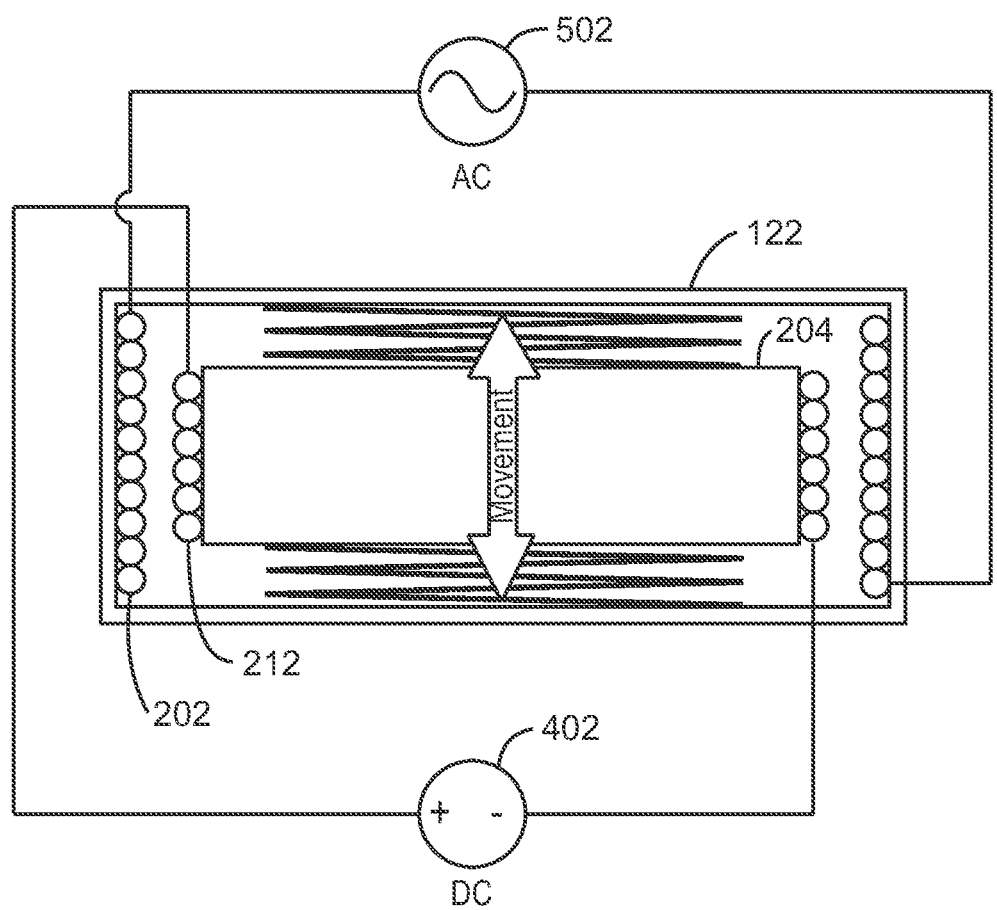
FIG. 5 shows the multifunction charger operating in the haptic feedback mode.

FIG. 5 shows the multifunction charger operating in the haptic feedback mode. When in haptic feedback mode, the multifunction charger 122 functions to generate a vibration. The vibration may be used to alert the caller regarding some condition of the electronic device 100, such as an incoming phone call, message, alarm, and others.

In haptic feedback mode, the moving coil 212 is coupled to a DC voltage or current source 402, and the magnetic core 204 is magnetized by driving a DC current to the moving coil 212. Additionally, the stationary coil 202 is coupled to an AC signal source 502, which generates the haptic feedback signal waveform. The current driven to the stationary coil 202 causes the magnetic core 204 to move up and down to generate the vibration felt by the user. For example, although shown as a DC source, the magnetizing current can also be an AC current that is in a phase difference relative to the current in the stationary coil 202.

Figure 6:
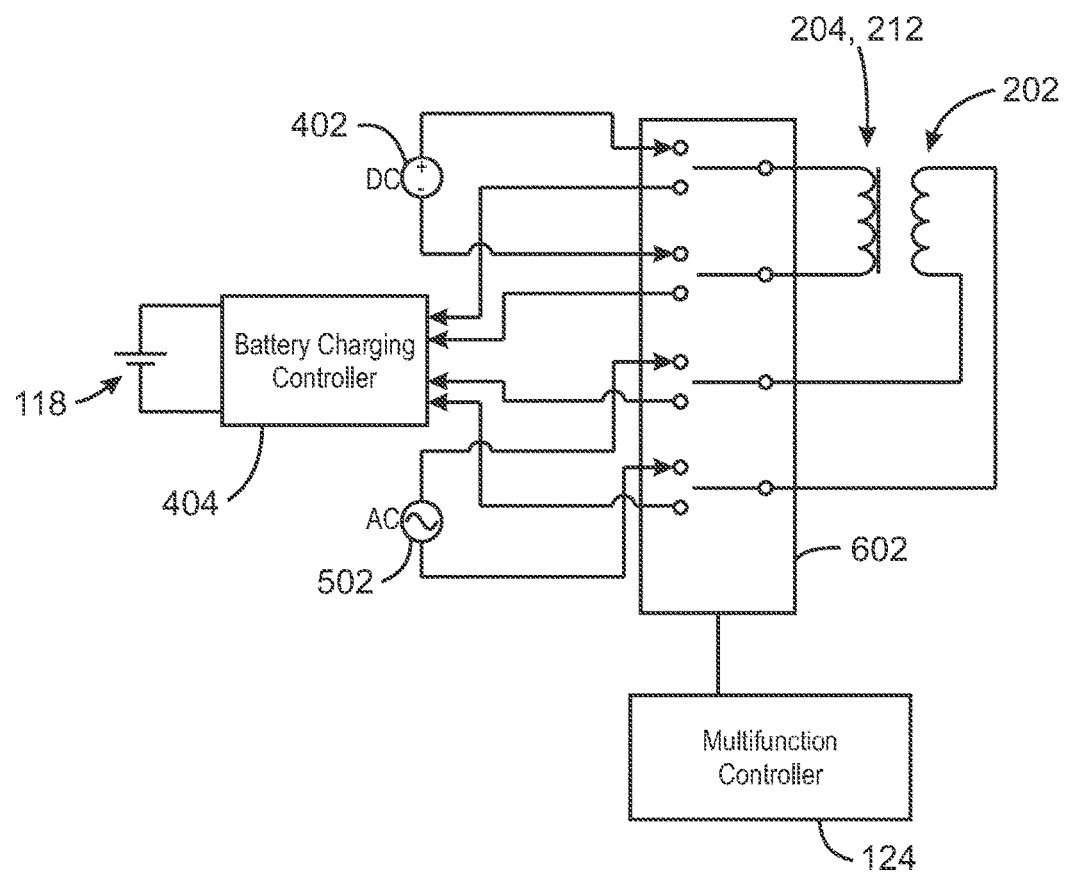
FIG. 6 is a block diagram of system circuitry that can be used to operate the multifunction charger.

FIG. 6 is a block diagram of system circuitry that can be used to operate the multifunction charger. As shown in FIG. 6, terminals of the moving coil 212 and the stationary coil 202 are coupled to a set of switches 602, which are controlled by the multifunction controller 604. Charging of the battery 118 is controlled by a battery charging controller 404.

Through the set of switches 602, the moving coil can be alternatively coupled to either the DC voltage source 402 or the battery charging controller 404, and the stationary coil 202 can be alternatively coupled to either the AC signal source 502 or the battery charging controller 404. The multifunction controller 604 configures the multifunction charger 122 for a particular mode by actuating the switches 602. In haptic feedback mode, the switches 602 are actuated to couple the moving coil 212 to the DC voltage source 402 and couple the stationary coil 202 to the AC signal source 502, which generates the haptic feedback signal waveform. In energy harvesting mode, the switches 602 are actuated to couple the moving coil 212 to the DC voltage 402 and couple the stationary coil 202 to the battery charging controller 404. In wireless charging mode, the switches 602 are actuated to couple both the moving coil 212 and stationary coil 202 to the battery charging controller 404.

In some examples, the multifunction controller 604 activates a particular mode in response to signals received from the processor 102 (FIG. 1). The mode activated by the multifunction controller 604 can depend on a number of factors. For example, the electronic device 100 could include a user interface that enables the user of the device to select the mode. Additionally, the mode may also be automatically selected depending on conditions detected by the electronic device 100. For example, the electronic device 100 may detect the presence of a wireless charging pad and cause the multifunction controller 604 to switch to the wireless charging mode based on the detection. Additionally, the electronic device 100 may cause the multifunction controller 604 to switch to the vibrational energy harvesting mode based on the detection of movement via an accelerometer.

Figure 7:
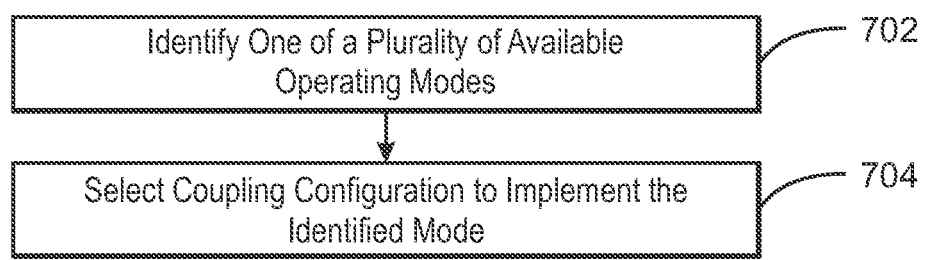
FIG. 7 is a process flow diagram of an example method of operating a multifunction charger.

FIG. 7 is a process flow diagram of an example method of operating a multifunction charger. The method 700 may be performed by components of the electronic device 100, including the processor 102, multifunction charger 122, the multifunction controller 604, or some combination thereof. The logic for performing the method is embodied in hardware, such as logic circuitry or one or more processors configured to execute instructions stored in a non-transitory, computer-readable medium.

At block 702, one of a plurality of available operating modes is identified. The available operating modes can include a wireless charging mode, a haptic feedback mode, and a vibrational energy harvesting mode. Identifying the mode may include receiving a signal from a sensor such as an accelerometer or magnetic field sensor, for example. Identifying the mode can also include receiving a mode selection signal from a processor and/or receiving a mode selection from a user. Identifying the mode can also include detecting a communication signal from a wireless charging transmitter or detecting a magnetic field generated by a wireless charging transmitter.

At block 704, a coupling configuration is selected to implement the identified mode. If the identified mode is the wireless charging mode, selecting the coupling configuration includes coupling the stationary winding and the movable winding to a battery charging circuit. If the identified mode is the haptic feedback mode, selecting the coupling configuration includes coupling the stationary winding to an AC signal source that provides a haptic feedback waveform and coupling the movable winding to a source of magnetizing current. If the identified mode is the vibrational energy harvesting mode, selecting the coupling configuration can include coupling the stationary winding to a battery charging circuit and coupling the movable winding to a source of magnetizing current.

The method 700 should not be interpreted as meaning that the blocks are necessarily performed in the order shown. Furthermore, fewer or greater actions can be included in the method 700 depending on the design considerations of a particular implementation.

EXAMPLES

Example 1 is an electronic device with a multifunction charger. The electronic device includes a processor; a memory device including instructions to be executed by the processor; a battery to provide electrical power to the processor and the memory device; a multifunction charger; and control circuitry configured to activate one of a plurality of available operating modes of the multifunction charger, wherein the plurality of operating modes of the multifunction charger includes a wireless charging mode and a haptic feedback mode.

Example 2 includes the electronic device of example 1, including or excluding optional features. In this example, the plurality of available operating modes of the multifunction charger includes a vibrational energy harvesting mode.

Example 3 includes the electronic device of any one of examples 1 to 2, including or excluding optional features. In this example, the multifunction charger includes: an enclosure; a first conductive winding fixedly disposed on an inner wall of the enclosure; a magnetic core suspended within the enclosure by a spring. Optionally, to activate wireless charging mode, the control circuitry is to conductively couple the first conductive winding to a battery charging circuit. Optionally, to activate haptic feedback mode, the control circuitry is to conductively couple the first conductive winding to an AC signal source that provides a haptic feedback waveform.

Example 4 includes the electronic device of any one of examples 1 to 3, including or excluding optional features. In this example, the magnetic core includes a permanent magnet.

Example 5 includes the electronic device of any one of examples 1 to 4, including or excluding optional features. In this example, the multifunction charger includes a second conductive winding surrounding the magnetic core. Optionally, to activate wireless charging mode, the control circuitry is to conductively couple the first conductive winding and the second conductive winding to a battery charging circuit. Optionally, to activate haptic feedback mode, the control circuitry is to: conductively couple the first conductive winding to an AC signal source that provides a haptic feedback waveform; and conductively couple the second conductive winding to a source of magnetizing current.

Example 6 includes the electronic device of any one of examples 1 to 5, including or excluding optional features. In this example, the plurality of available operating modes of the multifunction charger includes a vibrational energy harvesting mode, and to activate vibrational energy harvesting mode, the control circuitry is to: conductively couple the first conductive winding to a battery charging circuit; and conductively couple the second conductive winding to a source of magnetizing current.

Example 7 is a multifunction charger with a plurality of operating modes. The multifunction charger with a plurality of operating modes includes an enclosure; a first conductive winding fixedly disposed on an inner wall of the enclosure; a magnetic core suspended inside the enclosure by a spring; a second conductive winding surrounding the magnetic core; wherein a resonant frequency of the magnetic core and the spring or a plurality of springs is tuned for haptic effects and vibrational energy harvesting.

Example 8 includes the multifunction charger of example 7, including or excluding optional features. In this example, the multifunction charger includes control circuitry configured to activate one of a plurality of operating modes of the multifunction charger, wherein the plurality of operating modes of the multifunction charger includes a wireless charging mode and a haptic feedback mode. Optionally, to activate wireless charging mode, the control circuitry is to conductively couple the first conductive winding and the second conductive winding to a battery charging circuit. Optionally, to activate haptic feedback mode, the control circuitry is to: conductively couple the first conductive winding to an AC signal source that provides a haptic feedback waveform; and conductively couple the second conductive winding to a source of magnetizing current.

Example 9 includes the multifunction charger of any one of examples 7 to 8, including or excluding optional features. In this example, the plurality of operating modes of the multifunction charger includes a vibrational energy harvesting mode. Optionally, to activate the vibrational energy harvesting mode, the control circuitry is to: conductively couple the first conductive winding to a battery charging circuit; and conductively couple the second conductive winding to a source of magnetizing current.

Example 10 includes the multifunction charger of any one of examples 7 to 9, including or excluding optional features. In this example, the enclosure of the multifunction charger includes a ferromagnetic material or plurality of materials part of which can be ferromagnetic.

Example 11 is a method of operating a multifunction charger. The method includes identifying a mode from a plurality of available operating modes including a wireless charging mode, a haptic feedback mode, and a vibrational energy harvesting mode; and selecting a coupling configuration to implement the identified mode.

Example 12 includes the method of example 11, including or excluding optional features. In this example, the identified mode is the wireless charging mode and selecting the coupling configuration includes conductively coupling the stationary winding and the movable winding to a battery charging circuit.

Example 13 includes the method of any one of examples 11 to 12, including or excluding optional features. In this example, identifying the mode includes detecting a communication signal from a wireless charging transmitter.

Example 14 includes the method of any one of examples 11 to 13, including or excluding optional features. In this example, identifying the mode includes detecting a magnetic field generated by a wireless charging transmitter.

Example 15 includes the method of any one of examples 11 to 14, including or excluding optional features. In this example, the identified mode is the haptic feedback mode and selecting the coupling configuration includes: conductively coupling the stationary winding to an AC signal source that provides a haptic feedback waveform; and conductively coupling the movable winding to a source of magnetizing current.

Example 16 includes the method of any one of examples 11 to 15, including or excluding optional features. In this example, the identified mode is the vibrational energy harvesting mode and selecting the coupling configuration includes conductively coupling the stationary winding to a battery charging circuit; and conductively coupling the movable winding to a source of magnetizing current.

Example 17 includes the method of any one of examples 11 to 16, including or excluding optional features. In this example, identifying the mode includes receiving a mode selection signal from a processor.

Example 18 includes the method of any one of examples 11 to 17, including or excluding optional features. In this example, identifying the mode includes receiving a mode selection from a user.

Example 19 is a non-transitory computer readable medium. The computer-readable medium includes instructions that direct the processor to identify a mode from a plurality of operating modes available for the multifunction charger, the operating modes including a wireless charging mode, a haptic feedback mode, and a vibrational energy harvesting mode; and select a coupling configuration to implement the identified mode.

Example 20 includes the computer-readable medium of example 19, including or excluding optional features. In this example, the identified mode is the wireless charging mode and, to select the coupling configuration, the instructions direct the processor to conductively coupling the stationary winding and the movable winding to a battery charging circuit.

Example 21 includes the computer-readable medium of any one of examples 19 to 20, including or excluding optional features. In this example, to identify the mode includes to detect a communication signal from a wireless charging transmitter.

Example 22 includes the computer-readable medium of any one of examples 19 to 21, including or excluding optional features. In this example, to identify the mode includes to detect a magnetic field generated by a wireless charging transmitter.

Example 23 includes the computer-readable medium of any one of examples 19 to 22, including or excluding optional features. In this example, the identified mode is the haptic feedback mode and, to select the coupling configuration, the instructions direct the processor to: conductively couple the stationary winding to an AC signal source that provides a haptic feedback waveform; and conductively couple the movable winding to a source of magnetizing current.

Example 24 includes the computer-readable medium of any one of examples 19 to 23, including or excluding optional features. In this example, the identified mode is the vibrational energy harvesting mode and, to select the coupling configuration, the instructions direct the processor to: conductively couple the stationary winding to a battery charging circuit; and conductively couple the movable winding to a source of magnetizing current.

Example 25 includes the computer-readable medium of any one of examples 19 to 24, including or excluding optional features. In this example, to identify the mode includes to receive a mode selection signal from another processor.

Example 26 includes the computer-readable medium of any one of examples 19 to 25, including or excluding optional features. In this example, to identify the mode includes to receive a mode selection from a user.

Example 27 is an apparatus for controlling a multifunction charger. The apparatus includes instructions that direct the processor to means for identifying a mode from a plurality of operating modes available for the multifunction charger, the operating modes including a wireless charging mode, a haptic feedback mode, and a vibrational energy harvesting mode; and means for selecting a coupling configuration to implement the identified mode.

Example 28 includes the apparatus of example 27, including or excluding optional features. In this example, the identified mode is the wireless charging mode and the means for selecting the coupling configuration conductively couple the stationary winding and the movable winding to a battery charging circuit. Optionally, the means for identifying the mode detect a communication signal from a wireless charging transmitter. Optionally, the means for identifying the mode detect a magnetic field generated by a wireless charging transmitter.

Example 29 includes the apparatus of any one of examples 27 to 28, including or excluding optional features. In this example, the identified mode is the haptic feedback mode and the means for selecting the coupling configuration conductively couple the stationary winding to an AC signal source that provides a haptic feedback waveform, and conductively couple the movable winding to a source of magnetizing current.

Example 30 includes the apparatus of any one of examples 27 to 29, including or excluding optional features. In this example, the identified mode is the vibrational energy harvesting mode and the means for selecting the coupling configuration conductively couple the stationary winding to a battery charging circuit, and conductively couple the movable winding to a source of magnetizing current.

Example 31 includes the apparatus of any one of examples 27 to 30, including or excluding optional features. In this example, the means for identifying the mode receive a mode selection signal from another processor.

Example 32 includes the apparatus of any one of examples 27 to 31, including or excluding optional features. In this example, the means for identifying the mode receive a mode selection from a user.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
   a processor;
   a memory device comprising instructions to be executed by the processor;
   a battery to provide electrical power to the processor and the memory device;
   a multifunction charger comprising an enclosure, a first conductive winding fixedly disposed on an inner wall of the enclosure, and a magnetic core suspended within the enclosure by a spring; and
   control circuitry configured to activate one of a plurality of available operating modes of the multifunction charger, wherein the plurality of operating modes of the multifunction charger comprises a wireless charging mode and a haptic feedback mode, wherein, to activate wireless charging mode, the control circuitry is to conductively couple the first conductive winding to a battery charging circuit.

2. The electronic device of claim 1, wherein the plurality of available operating modes of the multifunction charger comprises a vibrational energy harvesting mode.

3. The electronic device of claim 1, wherein, to activate haptic feedback mode, the control circuitry is to conductively couple the first conductive winding to an AC signal source that provides a haptic feedback waveform.

4. The electronic device of claim 1, wherein the magnetic core comprises a permanent magnet.

5. The electronic device of claim 1, wherein the multifunction charger comprises a second conductive winding surrounding the magnetic core.

6. The electronic device of claim 5, wherein, to activate wireless charging mode, the control circuitry is to conductively couple the second conductive winding to a battery charging circuit.

7. The electronic device of claim 5, wherein, to activate haptic feedback mode, the control circuitry is to:
   conductively couple the first conductive winding to an AC signal source that provides a haptic feedback waveform; and
   conductively couple the second conductive winding to a source of magnetizing current.

8. The electronic device of claim 5, wherein the plurality of available operating modes of the multifunction charger comprises a vibrational energy harvesting mode, and to activate vibrational energy harvesting mode, the control circuitry is to:
   conductively couple the first conductive winding to a battery charging circuit; and
   conductively couple the second conductive winding to a source of magnetizing current.

9. A multifunction charger with a plurality of operating modes, comprising:
   an enclosure;
   a first conductive winding fixedly disposed on an inner wall of the enclosure;
   a magnetic core suspended inside the enclosure by a spring; and
   a second conductive winding surrounding the magnetic core;
   wherein the multifunction charger is configured to operate in one of a plurality of operating modes, wherein the plurality of operating modes comprises a wireless charging mode and a haptic feedback mode, wherein, to activate wireless charging mode, the control circuitry is to conductively couple the first conductive winding and the second conductive winding to a battery charging circuit; and
   wherein a resonant frequency of the magnetic core and the spring or a plurality of springs is tuned for haptic effects and vibrational energy harvesting.

10. The multifunction charger of claim 9, wherein, to activate haptic feedback mode, the control circuitry is to:
    conductively couple the first conductive winding to an AC signal source that provides a haptic feedback waveform; and
    conductively couple the second conductive winding to a source of magnetizing current.

11. The multifunction charger of claim 9, wherein the plurality of operating modes of the multifunction charger comprises a vibrational energy harvesting mode.

12. The multifunction charger of claim 11, wherein to activate the vibrational energy harvesting mode, the control circuitry is to:
    conductively couple the first conductive winding to a battery charging circuit; and
    conductively couple the second conductive winding to a source of magnetizing current.

13. The multifunction charger of claim 9, wherein the enclosure of the multifunction charger comprises a ferromagnetic material or plurality of materials part of which can be ferromagnetic.

14. A method of operating a multifunction charger comprising a stationary winding and a movable winding, the movable winding disposed around a magnetic core, the method comprising:
    identifying a mode from a plurality of available operating modes comprising a wireless charging mode, a haptic feedback mode, and a vibrational energy harvesting mode; and
    selecting a coupling configuration to implement the identified mode, wherein the identified mode is the wireless charging mode and selecting the coupling configuration comprises conductively coupling the stationary winding and the movable winding to a battery charging circuit.

15. The method of claim 14, wherein identifying the mode comprises detecting a communication signal from a wireless charging transmitter.

16. The method of claim 14, wherein identifying the mode comprises detecting a magnetic field generated by a wireless charging transmitter.

17. The method of claim 14, comprising identifying a second mode from the plurality of available operating modes, and selecting a second coupling configuration to implement the second identified mode, wherein the second identified mode is the haptic feedback mode and selecting the second coupling configuration comprises:
    conductively coupling the stationary winding to an AC signal source that provides a haptic feedback waveform; and conductively coupling the movable winding to a source of magnetizing current.

18. The method of claim 14, comprising identifying a second mode from the plurality of available operating modes, and selecting a second coupling configuration to implement the second identified mode, wherein the second identified mode is the vibrational energy harvesting mode and selecting the second coupling configuration comprises conductively coupling the stationary winding to a battery charging circuit; and conductively coupling the movable winding to a source of magnetizing current.

19. The method of claim 14, wherein identifying the mode comprises receiving a mode selection signal from a processor.

20. The method of claim 14, wherein identifying the mode comprises receiving a mode selection from a user.

* * * * *